United States Patent
Jamshidi et al.

(10) Patent No.: US 9,401,834 B1
(45) Date of Patent: Jul. 26, 2016

(54) CONTROL OVER CALL CONNECTION IN RESPONSE TO CALL-TEARDOWN REQUEST

(71) Applicant: Sprint Spectrum L.P., Overland Park, KS (US)

(72) Inventors: Talat Jamshidi, Leawood, KS (US); Jay D. Cole, Overland Park, KS (US); Suryanarayanan Ramamurthy, Olathe, KS (US); Rajat Kumar, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 126 days.

(21) Appl. No.: 14/302,798

(22) Filed: Jun. 12, 2014

(51) Int. Cl.
| | | |
|---|---|---|
| *H04L 29/06* | (2006.01) | |
| *H04W 4/00* | (2009.01) | |
| *H04W 8/30* | (2009.01) | |
| *H04W 4/22* | (2009.01) | |
| *H04W 36/00* | (2009.01) | |
| *H04W 92/04* | (2009.01) | |

(52) U.S. Cl.
CPC .... *H04L 29/06326* (2013.01); *H04L 29/06176* (2013.01); *H04L 29/06197* (2013.01); *H04L 29/06265* (2013.01); *H04L 29/06278* (2013.01); *H04W 4/22* (2013.01); *H04W 36/0022* (2013.01); *H04W 92/04* (2013.01)

(58) Field of Classification Search
CPC ... H04W 36/0022; H04W 4/22; H04W 92/04; H04L 65/103; H04L 65/1006; H04L 65/1016; H04L 65/1043
See application file for complete search history.

(56) References Cited

U.S. PATENT DOCUMENTS

| | | |
|---|---|---|
| 6,343,216 B1 | 1/2002 | Kim et al. |
| 6,633,760 B1 | 10/2003 | Ham et al. |

(Continued)

FOREIGN PATENT DOCUMENTS

WO    WO 2011/116101    9/2011

OTHER PUBLICATIONS

3rd Generation Partnership Project;Technical Specification Group Services and System Aspects; Single Radio Voice Call Continuity (SRVCC); Stage 2 (Release 12), Dec. 2013, 3GPP TS 23.216 V12.0.0 (Dec. 2013).*

(Continued)

*Primary Examiner* — Chi H Pham
*Assistant Examiner* — Shailendra Kumar

(57) ABSTRACT

A method and system for responding to a call-teardown request generated, for instance, as a result of a user equipment device (UE) losing coverage of a first serving radio access network (RAN) while the UE is engaged in a call with another party. A signaling intermediary receives the call-teardown message en route from a first call server to a second call server and responsively determines whether the UE is now served by a second RAN. Responsive to determining that the UE is served by the second RAN, the intermediary arranges for establishment of a new call connection with the UE via the second RAN and for linking of the new call connection with an existing leg of the call with the other party, and the intermediary discards the call-teardown message rather than forwarding it along to the second call server.

19 Claims, 5 Drawing Sheets

(56) References Cited

U.S. PATENT DOCUMENTS

| | | |
|---|---|---|
| 6,745,031 B2 | 6/2004 | Chun et al. |
| 7,072,641 B2 | 7/2006 | Satapathy |
| 7,885,234 B2 * | 2/2011 | Ejzak ................ H04W 36/0016 370/331 |
| 7,929,517 B2 | 4/2011 | Lin et al. |
| 8,447,303 B2 | 5/2013 | Gisby et al. |
| 9,167,502 B2 * | 10/2015 | Gray ....................... H04W 8/30 |
| 2008/0037746 A1 | 2/2008 | Dufrene et al. |
| 2015/0063346 A1 * | 3/2015 | Eswara ................. H04L 65/103 370/352 |

OTHER PUBLICATIONS

3rd Generation Partnership Project; Technical Specification Group Services and System Aspects; IP Multimedia Subsystem (IMS) Service Continuity; Stage 2 (Release 11), Jun. 2013, 3GPP TS 23.237 V11.8.0 (Jun. 2013).*

* cited by examiner

CONTROL OVER CALL CONNECTION IN RESPONSE TO CALL-TEARDOWN REQUEST

BACKGROUND

Unless otherwise indicated herein, the materials described in this section are not prior art to the claims and are not admitted to be prior art by inclusion in this section.

A typical radio access wireless (RAN) network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. Further, the base stations are then coupled with network infrastructure of the RAN that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the RAN.

In general, a RAN may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures initiation of communications, handover between coverage areas, and functions related to air interface communication.

In one particular arrangement, a RAN may provide a UE with connectivity to a packet-switched network, such as the public Internet and/or a private network, and the packet-switched network may in turn provide connectivity with a call server platform that facilitates call connections (generally any real-time communication sessions, such as voice calls, video sessions, or the like) with remote parties. An example of such a call server platform is the Internet Multimedia Subsystem (IMS), which includes one or more call servers (e.g., gateways, controllers, conference bridges, etc.) that function to set up, manage, and carry packet-based call connections between parties.

When a UE is in coverage of a RAN that provides the UE with connectivity to an IMS, the UE may engage signaling, such as Session Initiation Protocol (SIP) signaling, with the IMS to place or receive calls. For instance, to place a call, the UE may transmit via the RAN to an IMS call server a SIP INVITE designating a called party telephone number or address. In response, the IMS call server may then engage in further SIP signaling to set up a call connection with the called party (e.g., via another call server serving the called party) and to set up a call connection with the UE, and the IMS call server may then bridge those call connections together to allow UE to communicate with the called party. Likewise, if the IMS call server receives a request to set up a call from another party to the UE, the IMS call server may similarly engage in SIP signaling with the UE via the RAN to establish a call connection with the UE and may bridge that call connection with a connection to the calling party.

While a UE is engaged in such a call via the RAN, the IMS call server may regularly monitor its call connection with the UE, such as to ensure that communication traffic and/or signaling continues to flow between the UE and the IMS call server. If the IMS call server detects an absence of such communication traffic and/or signaling without receiving a normal call disconnect request (e.g., a normal end-of-call signal resulting from one of the parties hanging up), the IMS call server may responsively take action to tear down the other side of the call. For instance, the IMS call server may responsively transmit a SIP BYE message to a call server serving the other party in order to cause the other call server to tear down its connection with the other party. (Alternatively, if the same IMS call server is serving both the UE and the other party, that IMS call server may process such a tear-down internally.)

OVERVIEW

The present disclosure addresses a situation that may occur when a UE served by a first RAN engages in a call served by a call server, such as an IMS call server for instance, and, during the call, the UE loses its connection with the first RAN but then is then served instead by a second RAN. For instance, while the UE is engaged in the call via the first RAN, the UE may lose coverage of the first RAN and thus lose its connection with the first RAN and in turn with the call server. However, the UE may then begin being served by a second RAN that provides coverage in the area. By way of example, the first RAN may be an LTE RAN, and the second RAN may be a CDMA RAN. However, the RANs may take other forms as well.

As discussed above, when a UE loses its connection with the call server, the call server may detect failure of the connection and may responsively engage in signaling to tear down the other side of the call, such as sending a SIP BYE message to the call server serving the other party. However, in a scenario where the UE is now accessible via the second RAN, it may be possible to establish a new connection with the UE via the second RAN and to bridge that new connection with the existing connection to the other party so as to essentially allow the call between the UE and the other party to continue, albeit with a short interruption.

Disclosed herein is thus an arrangement for responding to a call-teardown request, such as a BYE message, by checking to determine whether the UE at issue is now served by a second RAN and, if so, then establishing a connection with the UE via the second RAN and bridging that connection with the connection to the other party. By way of example, an intermediary node in the IMS may intercept a call-teardown message that is en route from the call server serving the UE to a call server serving the other party and may responsively take action to determine whether the UE is now served by a second RAN. For instance, the intermediary node may query a server associated with the second RAN to determine whether the UE is now registered with the second RAN. If the intermediary node determines that the UE is served by the second RAN, then the intermediary node may in turn take action to establish a via the second RAN a call connection with the UE and to cause that call connection to be bridged with the existing connection with the other party, so as to allow the call to continue. And the intermediary node may discard the call-teardown message (i.e., not send the call-teardown message along to the other call server).

Advantageously with this arrangement, the call-teardown message that the call server transmits in an effort to tear down the other side of the call will not result in tear-down of the other side of the call. Rather, the intermediary node would instead save the call by establishing the new call connection with the UE via the second RAN that is now serving the UE, and by bridging that new call connection with the existing connection with the other party.

Accordingly, in one respect, disclosed herein is a method operable in a communication system in which a first RAN serves a first device and provides connectivity with a packet-switched network that connects with a first call server, where the first call server serves the first device with a voice call via the first RAN, the voice call being between the first device and a second device served by a second call server and including (i) a first leg between the UE and the first call server, (ii) a second leg between the first call server and the second call server, and (iii) a third leg between the second call server and the second device. In that arrangement, the method addresses a scenario where the first call server detects disconnection of the first device from the voice call and the first call server responsively generates and sends to the second call server a call-teardown message to signal an end of the voice call.

In accordance with the method, an intermediary node between the first call server and the second call server receives the sent call-teardown message en route from the first call server to the second call server. Responsive to that received call-teardown message, the intermediary node then determines whether the UE is now served by a second RAN, such as by querying an server associated with the second RAN. And responsive to thereby determining that the UE is now served by the second RAN, the intermediary node then discards the call-teardown message and carries out a call transfer process that includes (i) establishing via the second RAN a new call connection with the UE, and (b) causing the new call connection to be communicatively linked with at least the third leg of the voice call so as to allow the voice call between the UE and the other party to continue.

Further, in another respect, disclosed herein is a call session control node that functions as the intermediary node noted above. Such a call session control node is thus operable in a communication system in which a first RAN serves a first device and provides connectivity with a packet-switched network that connects with a first call server, where the first call server serves the first device with a voice call via the first RAN, the voice call being between the first device and a second device served by a second call server and including (i) a first leg between the UE and the first call server, (ii) a second leg between the first call server and the second call server, and (iii) a third leg between the second call server and the second device, and where, when the first call server detects disconnection of the first device from the voice call, the first call server responsively generates and sends to the second call server a call-teardown message to signal an end of the voice call.

In accordance with the disclosure, the call session control node includes a network communication interface, a processing unit, data storage, and program instructions stored in the data storage and executable by the processing unit, upon receipt of the call-teardown message en route from the first call server to the second call server, to determine in response to the call-teardown message whether the first device is now served by a second RAN, and, responsive to the determining being that the first device is now served by the second RAN, to carry out a call transfer process to transfer the voice call to be via the second RAN rather than passing the call-teardown message along to the second call server. In line with the discussion above, the call transfer process may include (a) establishing via the second RAN a new call connection with the first device, and (b) causing the new call connection to be communicatively linked with at least the third leg of the voice call so as to allow the voice call between the first device and the second device to continue.

Still further, disclosed herein is a method operable in a communication system in which a first RAN servers a UE and provides connectivity to a packet-switched network that connects with a first call server. In accordance with the method, the first call server serves the UE with a voice call via the first RAN, the voice call being between the UE and another party served by a second call server and including (i) a first leg between the UE and the first call server, (ii) a second leg between the first call server and the second call server and (iii) a third leg between the second call server and the other party. Further, while serving the UE with the voice call, the first call server detects disconnection of the UE from the voice call, and the first call server responsively generates and transmits to the second call server a call-teardown message to signal an end of the voice call.

In accordance with the method, an intermediary node then receives the call-teardown message en route from the first call server to the second call server and, responsive to the call-teardown message, the intermediary node determines whether the UE is now served by a second RAN and, responsive to determining that the UE is now served by the second RAN, the intermediary node (a) engages in signaling to establish a new call connection with the UE via the second RAN and to connect the new call connection with the third leg so as to allow the voice call between the UE and the other party to continue and (b) discards the call-teardown message.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
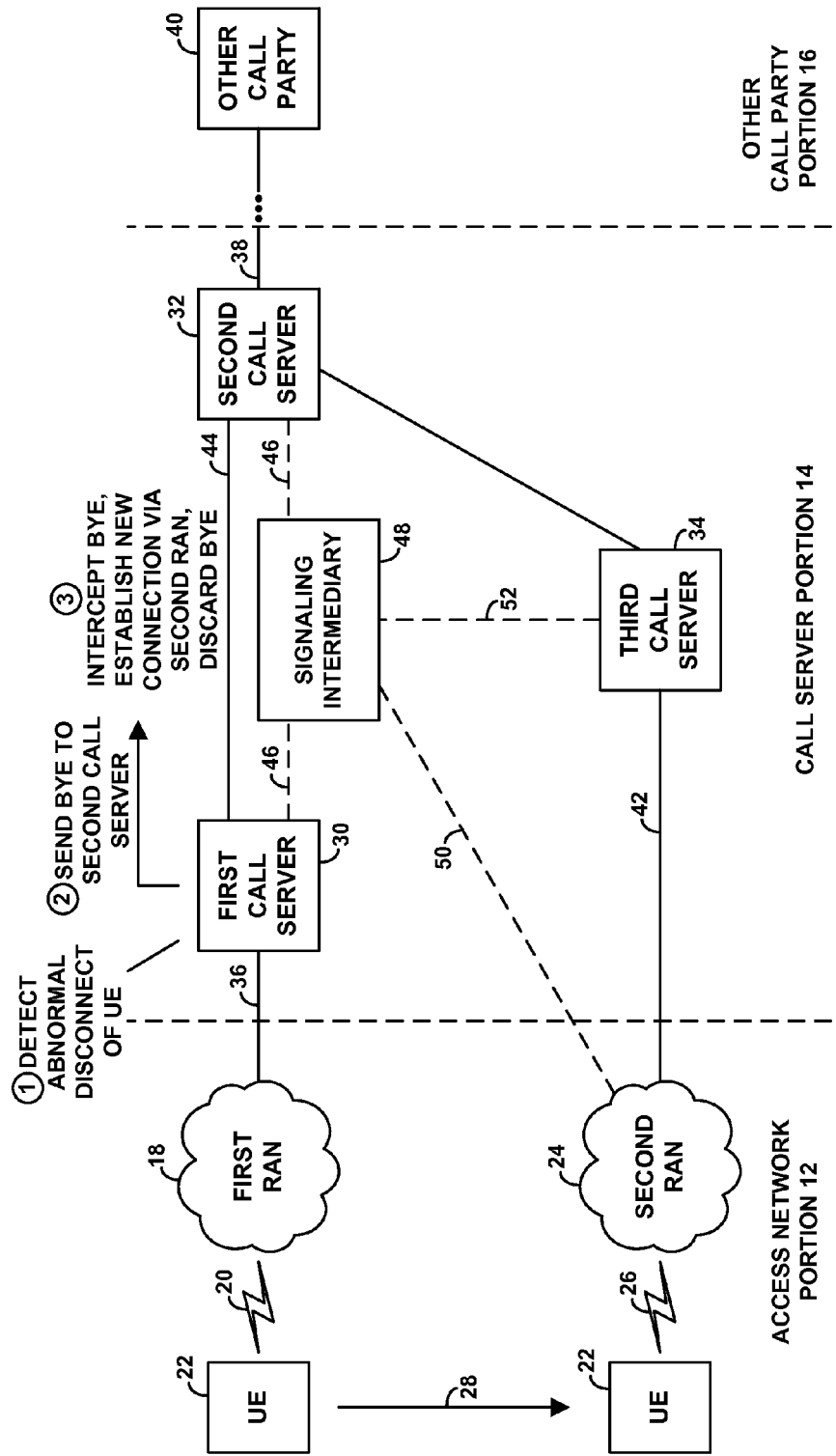
FIG. 1 is a simplified block diagram of a network arrangement in which aspects of the present disclosure can be implemented.

Referring to the drawings, as noted above, FIG. 1 is a simplified block diagram depicting an example network arrangement in which the present method can be implemented, and depicting certain functions of the present method. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As shown in FIG. 1, the example arrangement includes an access network portion 12, a call server portion 14, and a remote party portion 16, each of which includes various components. The figure depicts various interface between components with solid lines representing data interfaces and dashed lines representing signaling interface. In practice, many these interfaces may be direct or networked connections, including various routers, switches, gateways, or the like, and including one or more wired and/or wireless links, and one or more circuit-switched or packet-switched components, and the interfaces may be integrated, such as logical interfaces on a common network for instances. For example, various illustrated interfaces, while shown as discrete lines in the figure, may extend over a common packet-switched network.

In the example arrangement, the access network portion 12 includes a first RAN 18 that provides air interface coverage 20 in which a representative UE 22 may be served by the first RAN 18. Further, the access network portion 12 includes a second RAN 24 that provides air interface coverage 26 in which the representative UE 22 may be served by the second RAN 24. These two RANs 18, 24 are distinct RANs, each including one or more base stations and network infrastructure as noted above, to facilitate serving UEs and providing connectivity with one or more transport networks. In practice, for instance, the RANs may operate according to different air interface protocols but may provide overlapping coverage. The UE 22 may be configured to prefer service of the first RAN 18, but, upon loss of coverage of the first RAN, to transition to be served instead by the second RAN 24, as represented by the arrow 28 in the figure.

The call server portion 14 in turn includes a first call server 30 that functions to provide call connections for devices served by the first RAN 18, a second call server 32 that functions to provide call connections for other parties, and a third call server 34 that functions to provide call connections for devices served by the second RAN 24. In practice, these call servers may sit as nodes on a packet-switched network, such as the Internet or a telecommunication service provider's core packet network, and may have permanent or dynamically established interfaces for communicating with particular access networks and/or with served devices. For instance, the first call server 30 may have an interface 36 for communicating with the first RAN 18 and in turn with the UE 22 when the UE 22 is served by the first RAN 18, the second call server 32 may have an interface 38 for communicating with a remote call party (such as another UE or other type of communication device) 40, and the third call server 34 may have an interface 42 for communicating with the second RAN 24 and in turn with the UE 22 when the UE 22 is served by the second RAN 24.

As further shown, the example arrangement includes a data communication interface 33 extending between the first call server 30 and the second call server 32, for carrying data traffic such as voice data between the first call server 30 and the second call server 32. Further, the example arrangement includes a signaling interface 46 that also extends between the first call server 30 and the second call server 32, for carrying signaling traffic, such as call setup and management signaling, between the first call server 30 and the second call server.

In addition, as shown, the example arrangement, includes a signaling intermediary 48 that sits in the signaling interface 46 (or signaling path) between the first call server 30 and the second call server 32. This signaling intermediary 48 may have an interface 50 for engaging in signaling with the second RAN 24 or with an entity associated with the second RAN 24, to facilitate determining whether the UE 22 is currently served by the second RAN 24. Further, this signaling intermediary 44 may have an interface 52 for engaging in signaling with the third call server 34, to facilitate establishing a new call connection with the UE via the second RAN.

In practice with the arrangement shown in FIG. 1, the UE 22 would initially be served by the first RAN 18. In particular, the UE may have entered into coverage of the first RAN and registered with the first RAN, so that the first RAN would then provide the UE with connectivity to engage in communication with the first call serer. Through that connection, the UE and first call server may then have engaged in SIP signaling or other call setup signaling to establish a voice call between the UE and the remote call party 40. Thus, the voice call would initially extend over a path that includes a first call leg extending via the first RAN from the UE to the first call server, over a second leg extending from the first call server to the second call server, and over a third leg extending from the second call serer to the remote party.

During the voice call, the first call server may monitor its connection (the first call leg) with the UE, such as by engaging in periodic session management signaling (e.g., heartbeat messaging) or by monitoring for the presence of voice call data arriving from the UE. And at some point, the first call server may detect failure of that connection, as an abnormal disconnection of the UE. This may occur, for instance, if the UE moves out of coverage of the first RAN so that the UE loses its ability to communicate with the first call server, or for various other reasons. But this failure of the connection with the UE is an abnormal disconnection, distinguished from the scenario where the UE or the other party normally end the call by hanging up, thereby triggering a normal end-of-call signal.

In response to detecting this abnormal disconnection of the UE, the first call server may then generate and transmit to the second call server 32 a call-teardown message, such as a SIP BYE message, to trigger tear-down of the second call leg and third call leg. In particular, such as call-teardown message may then pass from the first call server 30 to the second call server 32, and the second call server may responsively take action to tear down the third leg of the call extending between the second call server and the remote call party 40.

As noted above, however, the present disclosure helps to address a scenario where a UE has abnormally disconnected but has transitioned to be served by the second RAN instead, or is otherwise now served by the second RAN. For instance, the UE may have lost coverage of the first RAN but may have then entered into service of the second RAN. In practice, the UE may have already registered or attached with the second RAN before this happens, or may do so when this happens. The second RAN may thus now provide the UE with connectivity to engage in communication with the third call server 34.

In this scenario, rather than allowing the call-teardown message to have its intended effect of tearing down the third leg of the call, it may be beneficial to establish a new call connection to the UE via the second RAN and to bridge that new call connection with the third leg of the existing voice call, so as to effectively allow the voice call between the UE and the remote party to continue.

To accomplish this in practice, the signaling intermediary 48 may intercept the call-teardown message en route from the first call server 30 to the second call server 32 and, rather than forwarding the call-teardown message to the second call server, take action to save the voice call by connecting the call to the UE via the second RAN 24 instead.

In particular, in response to receiving the call-teardown message, the signaling intermediary may engage in signaling via interface 50 with an entity associated with the second RAN, such as a home location register or the like, to determine whether the UE is now served by the second RAN. Responsive to thereby determining that the UE is now served by the second RAN, the signaling intermediary may then engage in signaling with the third call server 34 and second call server 32 to establish a new call connection with the UE via the second RAN and to communicatively link that new call connection with at least the third call leg out to the remote party 40.

For instance, the signaling intermediary may act as a third-party call control server, sending to the third call server 34 a SIP INVITE on behalf of the second call server to request placement of a call to the UE via the second RAN, and sending to the second call server a SIP REFER that specifies transfer of the call from being connected with the first call server 30 to being connected with the third call server 34. Through this process, although the call participants may experience a short pause in the voice call, the voice call may ultimately continue via a call path that now includes a first leg extending from the UE to the third call server 34 via the second RAN, a new leg extending from the third call server 34 to the second call server 32, and the previously existing third call leg extending from the second call server 32 to the remote party 40.

Figure 2:
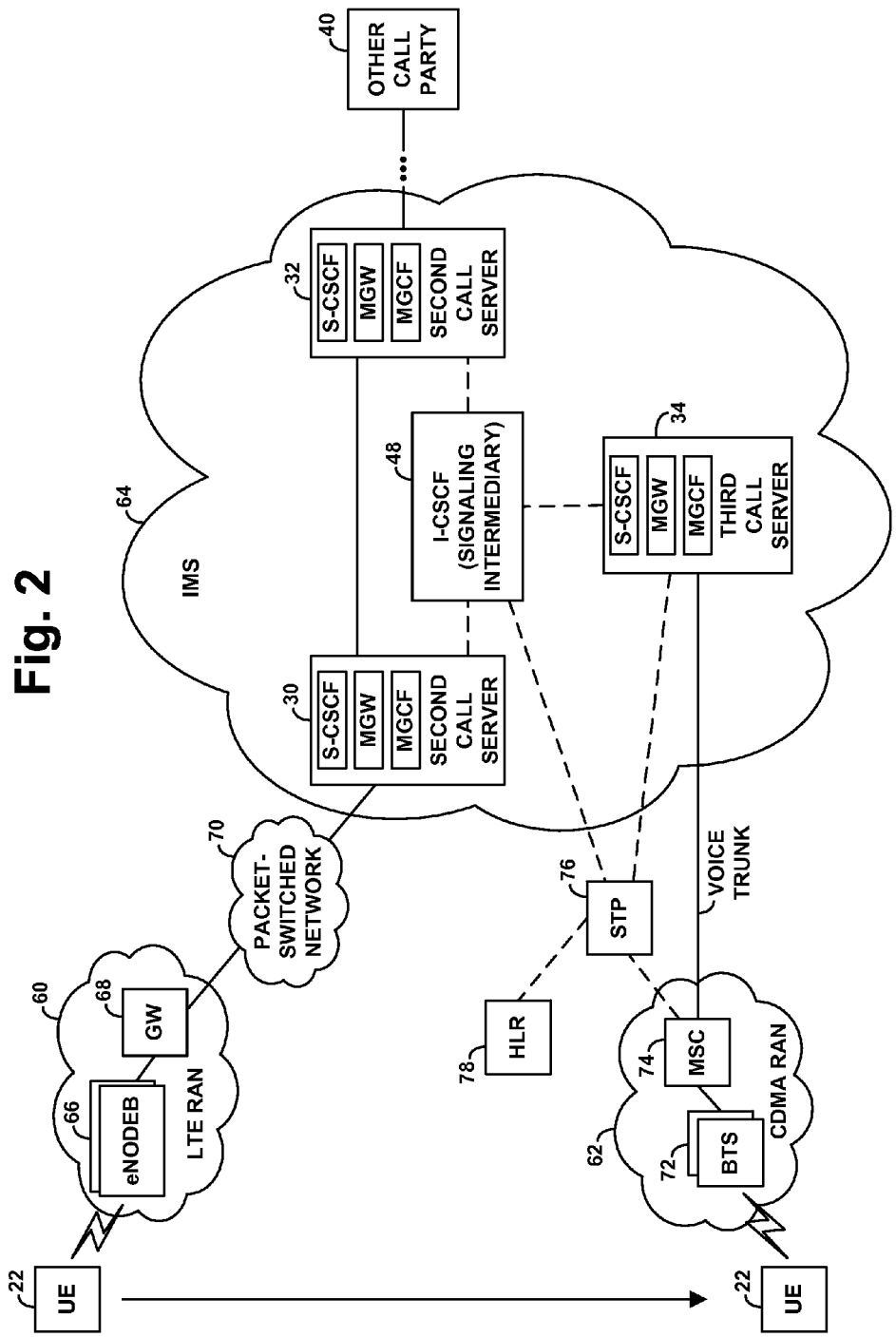
FIG. 2 is another simplified block diagram of a network arrangement in which aspects of the disclosure can be implemented.

FIG. 2 is next more specific, but still simplified, block diagram of an example arrangement in which the above process can be implemented. This figure illustrates an example where the first RAN is an LTE RAN 60, the second RAN is a CDMA RAN 62, and the first, second, and third call servers are components of an IMS 64.

As shown in particular, the LTE RAN 60 includes one or more LTE base stations 66 known as evolved Node Bs (eNodeBs), which are communicatively linked with a gateway 68 that provides connectivity with a packet-switched network 70, and the packet-switched network in turn provides connectivity with the IMS 64 and particularly the first call server 30. The CDMA RAN 62, on the other hand, includes one or more CDMA base stations 72 known as base transceiver stations (BTSs), which are communicatively linked with a mobile switching center (MSC) 74. The MSC 74 then has a voice trunk connection or other interface with the IMS 64 and particularly with the third call server 34. Further, the MSC 74 has a signaling interface with a signal transfer point (STP) 76, which in turn has a signaling interface with a home location register (HLR) 78 of the CDMA RAN 62 and a signaling interface with the IMS 64 such as with the signaling intermediary 48.

As further shown by way of example, each of the call servers 30, 32, 34 includes various IMS components, including a respective serving call session control function (S-CSCF), a respective media gateway (MGW), and a respective media gateway control function (MGCF). In practice, the S-CSCF of each call server may be an intelligent SIP signaling proxy arranged to carry out special functions in response to SIP signaling. The MGW of each call server may then be a gateway that functions to receive and send media, such as packet-based real-time voice data for instance, and may further transcode between various media communication formats, such as between packet-based real-time voice data and pulse-code modulated voice data for instance. And the MGCF of each call server may be a signaling controller for managing setup and communication of media to and from the respective media gateway, and may further transcode between various signaling formats, such as between SIP signaling on a packet-based interface and Integrated Services Digital Network User Part (ISUP) signaling on a circuit-based interface.

The signaling intermediary 48 in this example arrangement is then shown as an interrogating CSCF (I-CSCF), through which SIP signaling between the first call server 30 and the second call server 32 may pass. Further, as noted above, the signaling intermediary 48 has a signaling interface with the HLR 78 of the CDMA RAN 62.

With this example arrangement, the UE may initially be served by the LTE RAN, which provides the UE with packet-data connectivity to facilitate communication with the first call server. Through SIP signaling with the first call server, the UE may thus place a voice call to the remote party 40 or receive a voice call from the remote party 40, with the voice call extending over a path that includes a first leg extending via the LTE RAN to the MGW of the first call server 30, a second call leg that extends from the MGW of the first call server 30 to the MGW of the second call server 32, and a third call leg that extends from the MGW of the second call server 32 to the remote call party 40.

At some point during this voice call, the first call server 30 (e.g., S-CSCF or MGCF) may then detect an abnormal disconnection of the UE, possibly resulting from the UE losing coverage of the first RAN, and the first call server 30 may responsively generate and transmit to the second call server (e.g., S-CSCF and/or MGCF of the second call server) a SIP BYE message containing a cause-code that indicates an abnormal disconnection as opposed to a normal end of call.

In line with the discussion above, this SIP BYE message may then normally pass from the first call server 30 to the second call server and would cause the second call server to tear down the call connection with the remote party 40. However, per the present disclosure, the I-CSCF as signaling intermediary will instead intercept that SIP BYE message and take action to save the voice call by extending the call to the UE via the CDMA RAN if possible. In particular, the I-CSCF may take this action in response to reading the SIP BYE message and determining that the message indicates an abnormal disconnection, as opposed to a normal end of call.

To accomplish this in the example arrangement shown, the I-CSCF may first query a home subscriber server (HSS) of the IMS (not shown) to determine a CDMA identifier of the UE, such as a mobile directory number, based on an identifier of the UE known to the I-CSCF. The I-CSCF may then transmit to via the STP 76 to the HLR 78 an IS-41 location request (LOCREQ) request message keyed to the UE identifier, seeking to determine if the UE is now served by the CDMA RAN. If the UE is now served by the CDMA RAN, then the HLR 78 may have a record indicating the network address (point code) of the MSC 74 serving the UE. Thus, in response to the LOCREQ keyed to the UE identifier, the I-CSCF may receive from the HLR a location request return result (locreq_rr) specifying that MSC address, and thus indicating that the UE is now served by the CDMA RAN. Whereas, if the UE is not served by the CDMA RAN, then the I-CSCF may receive from the HLR an error response or a locreq_rr that indicates the UE is not served by the CDMA RAN.

In response to determining that the UE is now served by the CDMA RAN, the I-CSCF may then engage in signaling to transfer the voice call to the UE via the CDMA RAN. In particular, the I-CSCF may transmit to the third call server (e.g., S-CSCF and/or MGCF of the third call server) a SIP INVITE on behalf of the second call server (e.g., S-CSCF and/or MGCF of the second call server), by structuring the SIP INVITE to read as though it originated from the second call server for instance, with the SIP INVITE designating the UE's CDMA identifier (e.g., MDN) to which a new call connection should be established. This SIP INVITE would thus cause the third call server (e.g., MGCF of the third call server) to engage in ISUP signaling with the MSC 74 of the CDMA RAN to set up a new call connection via the CDMA RAN between the UE and the third call server.

Further, the I-CSCF may include in this SIP INVITE to the third call server an indication of the Internet Protocol (IP) address and port at the MGW of the second call server where the voice call is currently connected, so that the third call server can become set to communicate with the second call server at that IP address and port. And the I-CSCF may receive in a SIP 200 OK response from the third call server an indication of IP address and port at the MGW of the third call server where the second call server can communicate with the third call server.

Meanwhile or perhaps in response to detecting successful setup of the new call connection with the UE via the CDMA RAN, the I-CSCF may also engage in SIP signaling with the second call server (e.g., S-CSCF and/or MGCF of the second call server) to essentially direct the second call server to transfer the voice call connection from being with the first call server to instead being with the third call server. In practice, for instance, the I-CSCF may transmit a SIP REFER to the second call server, including in the SIP REFER an identifier of the call, and the IP address and port at the MGW of the third call server, as a directive for the second call server to transfer its communication from being with the first call server to being with the third call server.

Though this process, the I-CSCF would thus have successfully established (i.e., caused establishment of) a new call connection with the UE via the CDMA RAN and bridging of that new call connection with the existing third leg of the voice call extending from the second call server to the remote party 40. Notwithstanding a short pause in in the voice call, the UE may then continue to engage in the voice call with the remote party 40, now by a call path that includes a first leg extending via the CDMA RAN between the UE and the third call server, a new call leg extending between the third call server and the second call server, and the previously existing third leg extending from the third call server to the remote party 40.

Alternatively or additionally, the extension of the voice call may include the extension of the second leg that extends from the first call server to the second call server. For instance, rather than arranging for the new call connection via the CDMA RAN to be communicatively linked with the second call server and thus with the existing third call leg, the process could involve arranging for the new call connection via the CDMA RAN to be communicatively linked with the first call server, essentially maintaining both second call leg and the third call leg. In that way, the saved voice call would then extend between the UE and the remote party 40 over a call path that includes a first call leg extending via the CDMA RAN between the UE and the third call server, a new call leg extending between the third call server and the first call server, the previously existing second call leg extending between the first call server and the second call server, the previously existing third call leg extending between the second call server and the remote party 40.

Having thus successfully saved the voice call, the I-CSCF may then further discard the received SIP BYE message to avoid having it reach the second call server and thus to avoid having the SIP BYE message cause the voice call to end. In practice, for instance, this may involve simply not passing the SIP BYE message along to its destination (the second call server). Further, this may involve sending to the first call server a SIP 200 OK to complete the signaling from the perspective of the first call server.

Figure 3:
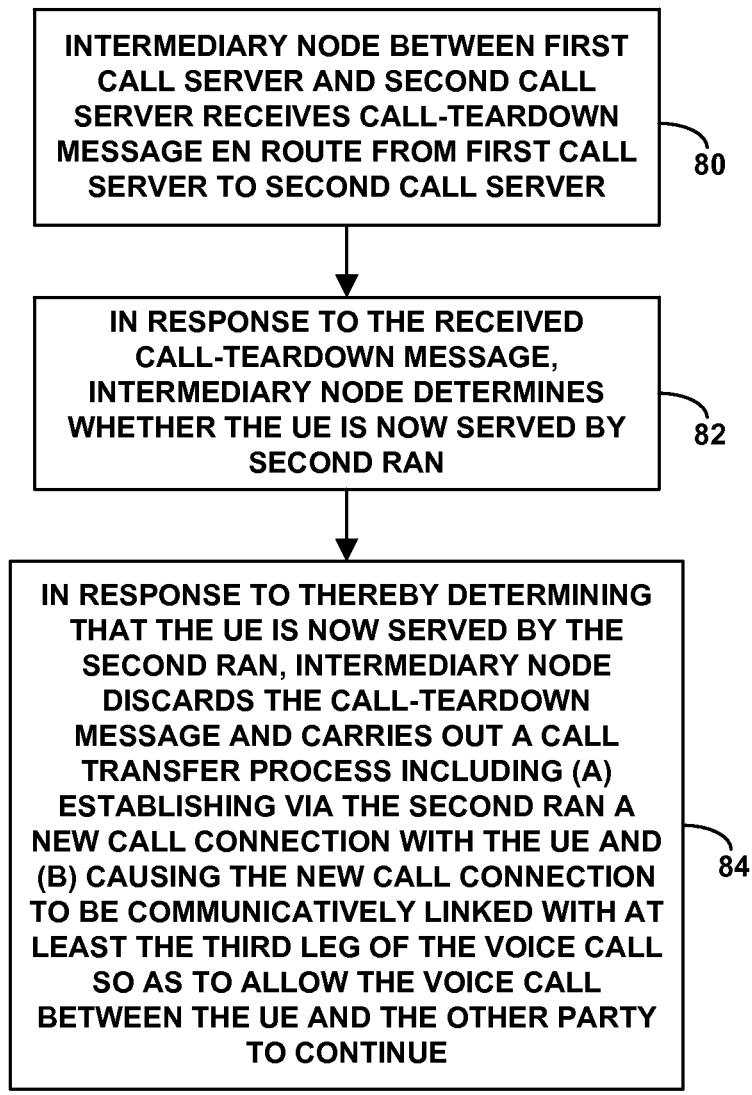
FIG. 3 is a flow chart depicting functions that can be carried out in accordance with the disclosure.

FIG. 3 is next a flow chart depicting functions that can be carried out by an intermediary node such as an I-CSCF in line with the discussion above. As shown in FIG. 3, at block 80, the intermediary node between the first call server and the second call server receives the call-teardown message en route from the first call server to the second call server. At block 82, in response to the received call-teardown message, the intermediary node then determines whether the UE is now served by a second RAN. And at block 84, in response to thereby determining that the UE is now served by the second RAN, the intermediary node discards the call-teardown message and carries out a call transfer process that involves (a) establishing via the second RAN a new call connection with the UE and (b) causing the new call connection to be communicatively linked with at least the third leg of the voice call so as to allow the voice call between the UE and the other party to continue.

Figure 4:
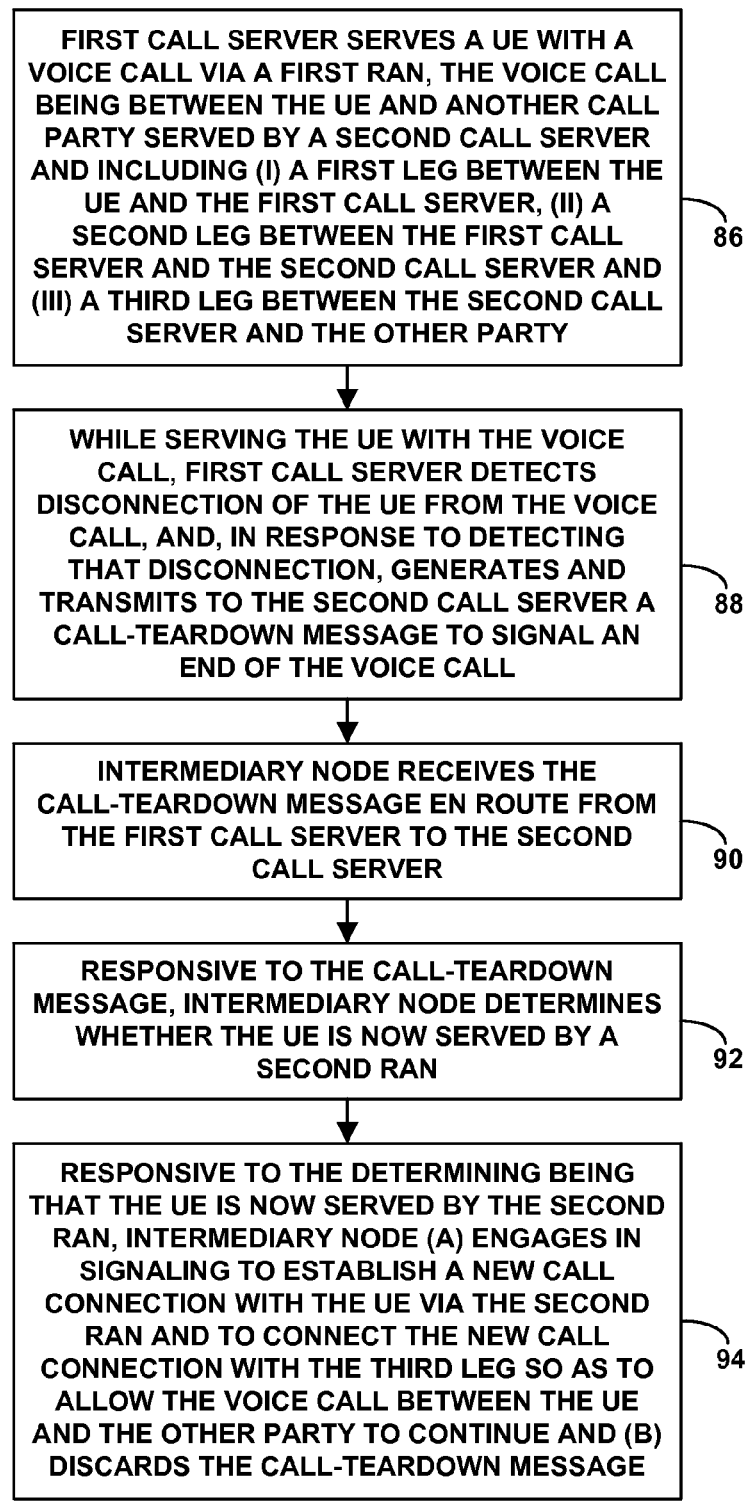
FIG. 4 is another flow chart depicting functions that can be carried out in accordance with the disclosure.

Further, FIG. 4 is another flow chart depicting functions that can be carried out in accordance with the present disclosure. As shown in FIG. 4, at block 86, a first call server serves a UE with a voice call via a first RAN, the voice call being between the UE and another call party served by a second call server and including (i) a first leg between the UE and the first call server, (ii) a second leg between the first call server and the second call server and (iii) a third leg between the second call server and the other party. At block 88, while serving the UE with the voice call, the first call server then detects disconnection of the UE from the voice call, and in response to detecting that disconnection, the first call server generates and transmits to the second call server a call-teardown message to signal an end of the voice call.

In turn, at block 90, an intermediary node receives the call-teardown message en route from the first call server to the second call server. Further, at block 92, responsive to the call-teardown message, the intermediary node determines whether the UE is now served by a second RAN. And at block 94, responsive to the determining being that the UE is now served by the second RAN, the intermediary node (a) engages in signaling to establish a new call connection with the UE via the second RAN and to connect the new call connection with the third leg so as to allow the voice call between the UE and the other party to continue and (b) discards the call-teardown message.

Figure 5:
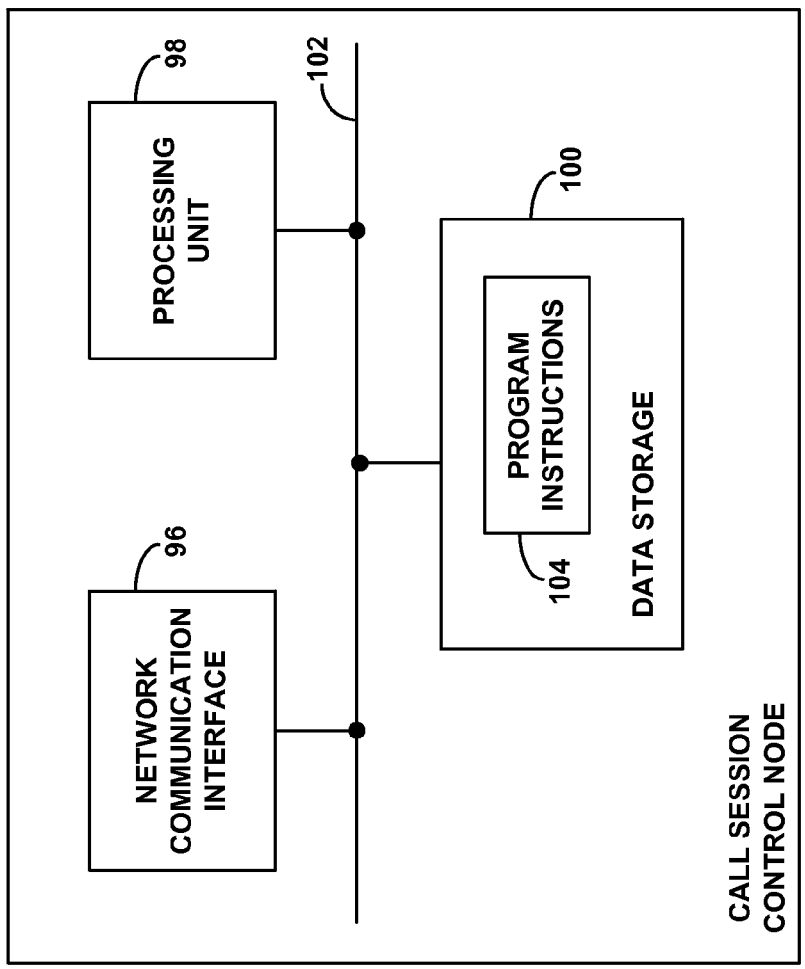
FIG. 5 is a simplified block diagram of an example signaling intermediary operable in accordance with the disclosure.

Finally, FIG. 5 is a simplified block diagram of an example call session control node, such as the I-CSCF or other signaling intermediary as shown in FIGS. 1 and 2 for instance, showing some of the components that such an entity can include. In practice, this call session control node may be operable in a communication system as described above, where a first RAN serves a first device and provides connectivity with a packet-switched network that connects with a first call server, where the first call server serves the first device with a voice call via the first RAN, the voice call being between the first device and a second device served by a second call server and including (i) a first leg between the UE and the first call server, (ii) a second leg between the first call server and the second call server, and (iii) a third leg between the second call server and the second device, and where, when the first call server detects disconnection of the first device from the voice call, the first call server responsively generates and sends to the second call server a call-teardown message to signal an end of the voice call.

As shown in FIG. 5, the example call session control node includes a network communication interface 96, a processing unit 98, and data storage 100, all of which may be communicatively linked together by a system bus, network, or other connection mechanism 102.

The network communication interface 96 facilitates communication with other entities shown in the figures, such as with the first, second, and third call severs 30, 32, 34, and with the STP 76. As such, the network communication interface may comprise an Ethernet interface or other type of interface suitable for engaging in such communication.

The processing unit 98 may then comprise one or more general purpose processors (e.g., microprocessors) and/or one or more special purpose processors (e.g., application specific integrated circuits) and may be integrated in whole in part with the network communication interface 96. Further, the data storage 100 may comprise one or more volatile and/or non-volatile storage components (non-transitory data storage), such as magnetic, optical, flash, or other storage, and may be integrated in whole or in part with the processing unit 98.

As additionally shown, the data storage 100 holds program instructions 104 executable by the processing unit 98 to carry out various functions described herein. For instance, the program instructions may be executable by the processing unit, upon receipt of the call-teardown message en route from the first call server to the second call server, to determine in response to the call-teardown message whether the first device is now served by a second RAN, and, responsive to thereby determining that the first device is now served by the second RAN, to carry out a call transfer process to transfer the voice call to be via the second RAN rather than passing the call-teardown message along to the second call server. In line with the discussion above, the call transfer process may comprise (a) establishing via the second RAN a new call connection with the first device, and (b) causing the new call connection to be communicatively linked with at least the third leg of the voice call so as to allow the voice call between the first device and the second device to continue.

Exemplary embodiments have been described above. Those skilled in the art will understand, however, that changes and modifications may be made to these embodiments without departing from the true scope and spirit of the invention.

We claim:

1. In a communication system in which a first radio access network (RAN) serves a first device and provides connectivity with a packet-switched network that connects with a first call server, wherein the first call server serves the first device with a voice call via the first RAN, the voice call being between the first device and a second device served by a second call server and including (i) a first leg between the UE and the first call server, (ii) a second leg between the first call server and the second call server, and (iii) a third leg between the second call server and the second device, and wherein, when the first call server detects disconnection of the first device from the voice call, the first call server responsively generates and sends to the second call server a call-teardown message to signal an end of the voice call, a method comprising:

at an intermediary node between the first call server and the second call server, receiving the sent call-teardown message en route from the first call server to the second call server;

responsive to the received call-teardown message, determining by the intermediary node whether the UE is now served by a second RAN; and responsive to the determining being that the UE is now served by the second RAN, discarding by the intermediary node the call-teardown message and carrying out by the intermediary node a call transfer process comprising (a) establishing via the second RAN a new call connection with the UE and (b) causing the new call connection to be communicatively linked with at least the third leg of the voice call so as to allow the voice call between the UE and the other party to continue.

2. The method of claim 1, wherein the call-teardown message is a Session Initiation Protocol (SIP) BYE message.

3. The method of claim 1, wherein the first RAN is a Long Term Evolution (LTE) RAN, and wherein the second RAN is a Code Division Multiple Access (CDMA) RAN.

4. The method of claim 3, wherein the determining whether the UE is now served by the second RAN comprises:

transmitting to a Home Location Register (HLR) of the second RAN a LOCREQ request message keyed to the UE; and receiving in response from the HLR a locreq return result that indicates whether the UE is being served by the second RAN.

5. The method of claim 4, wherein establishing via the second RAN the new call connection with the UE comprises transmitting to a media gateway control function (MGCF) a session initiation message keyed to a CDMA RAN identifier of the UE, wherein the MGCF responsively engages in signaling with the CDMA RAN to set up the new call connection extending between a media gateway (MGW) and the UE via the CDMA RAN.

6. The method of claim 5, wherein causing the new call connection to be communicatively linked with at least the third leg of the voice call so as to allow the voice call between the first device and the second device to continue comprises engaging in signaling with the second call server and MGCF to communicatively link the new call connection and the third leg of the voice call.

7. The method of claim 1, wherein discarding the call-teardown message results in the call-teardown message not reaching the second call sever, so as to avoid having the call-teardown message cause the voice call to end.

8. A call session control node operable in a communication system in which a first radio access network (RAN) serves a first device and provides connectivity with a packet-switched network that connects with a first call server, wherein the first call server serves the first device with a voice call via the first RAN, the voice call being between the first device and a second device served by a second call server and including (i) a first leg between the UE and the first call server, (ii) a second leg between the first call server and the second call server, and (iii) a third leg between the second call server and the second device, and wherein, when the first call server detects disconnection of the first device from the voice call, the first call server responsively generates and sends to the second call server a call-teardown message to signal an end of the voice call, the call session control node comprising:

a network communication interface;

a processing unit;

data storage; and program instructions stored in the data storage and executable by the processing unit upon receipt of the call-teardown message en route from the first call server to the second call server, to determine in response to the call-teardown message whether the first device is now served by a second RAN, and, responsive to the determining being that the first device is now served by the second RAN, to carry out a call transfer process to transfer the voice call to be via the second RAN rather than passing the call-teardown message along to the second call server, wherein the call transfer process comprises (a) establishing via the second RAN a new call connection with the first device, and (b) causing the new call connection to be communicatively linked with at least the third leg of the voice call so as to allow the voice call between the first device and the second device to continue.

9. The call session control node of claim 8, wherein the call-teardown message is a Session Initiation Protocol (SIP) BYE message.

10. The call session control node of claim 8, wherein the first RAN is a Long Term Evolution (LTE) RAN, and wherein the second RAN is a Code Division Multiple Access (CDMA) RAN.

11. The call session control node of claim 10, wherein the determining whether the first device is now served by the second RAN comprises:

transmitting to a Home Location Register (HLR) of the second RAN a LOCREQ request message keyed to the first device; and receiving in response from the HLR a locreq return result that indicates whether the first device is being served by the second RAN.

12. The call session control node of claim 11, wherein establishing via the second RAN the new call connection with the first device comprises transmitting to a media gateway control function (MGCF) a session initiation message keyed to a CDMA RAN identifier of the first device, wherein the MGCF responsively engages in signaling with the CDMA RAN to set up the new call connection extending between a media gateway (MGW) and the first device via the CDMA RAN.

13. The call session control node of claim 12, wherein causing the new call connection to be communicatively linked with at least the third leg of the voice call so as to allow the voice call between the first and the second device to continue comprises engaging in signaling with the second call server and MGCF to communicatively link the new call connection and the third leg of the voice call.

14. In a communication system in which a first radio access network (RAN) serves a user equipment device (UE) and provides connectivity to a packet-switched network that connects with a first call server, a method comprising:

the first call server serving the UE with a voice call via the first RAN, wherein the voice call is between the UE and another call party served by a second call server and includes (i) a first leg between the UE and the first call server, (ii) a second leg between the first call server and the second call server and (iii) a third leg between the second call server and the other party;

while serving the UE with the voice call, the first call server detecting disconnection of the UE from the voice call, and the first call server responsively generating and transmitting to the second call server a call-teardown message to signal an end of the voice call; and an intermediary node receiving the call-teardown message en route from the first call server to the second call server and, responsive to the call-teardown message, the intermediary node determining whether the UE is now served by a second RAN and, responsive to the determining being that the UE is now served by the second RAN, the intermediary node (a) engaging in signaling to establish a new call connection with the UE via the second RAN and to connect the new call connection with the third leg so as to allow the voice call between the UE and the other party to continue and (b) discarding the call-teardown message.

15. The method of claim 14, wherein the call-teardown message is a Session Initiation Protocol (SIP) BYE message.

16. The method of claim 14, wherein the first RAN is a Long Term Evolution (LTE) RAN, and wherein the second RAN is a Code Division Multiple Access (CDMA) RAN.

17. The method of claim 16, wherein the determining whether the UE is now served by the second RAN comprises:

transmitting to a Home Location Register (HLR) of the second RAN a LOCREQ request message keyed to the UE; and receiving in response from the HLR a locreq return result that indicates whether the UE is being served by the second RAN.

18. The method of claim 17, wherein engaging in signaling establish a new call connection with the UE via the second RAN and to connect the new call connection with the third leg so as to allow the voice call between the UE and the other party to continue comprises:

engaging in signaling with a media gateway control function (MGCF) to cause the MGCF to set up the new call connection between a media gateway (MGW) and the UE via the CDMA RAN; and engaging in signaling with the second call server to communicatively link the new call connection with the third leg.

19. The method of claim 14, wherein discarding the call-teardown message results in the call-teardown message not reaching the second call sever, so as to avoid having the call-teardown message cause the voice call to end.

* * * * *